United States Patent [19]
Dutch

[11] 3,718,045
[45] Feb. 27, 1973

[54] THERMOMETER SPINNER
[76] Inventor: Emery Dutch, 320 West 77th Street, New York, N.Y. 10024
[22] Filed: July 19, 1971
[21] Appl. No.: 163,787

[52] U.S. Cl. ..................................73/373, 233/26
[51] Int. Cl. .................................................G01k 5/06
[58] Field of Search ...............73/373, 338.6; 233/26; 248/316 A

[56] References Cited

UNITED STATES PATENTS

| | | | |
|---|---|---|---|
| 1,417,365 | 5/1922 | Wallendorf | 73/373 |
| 1,024,824 | 4/1912 | Boman | 73/373 |

FOREIGN PATENTS OR APPLICATIONS

| | | | |
|---|---|---|---|
| 68,416 | 8/1969 | Germany | 248/316 A |

Primary Examiner—Louis R. Prince
Assistant Examiner—Daniel M. Yasich
Attorney—Nichol M. Sandoe et al.

[57] ABSTRACT

An improved, hand-operated, thermometer spinner including a thermometer gripping and spinning section comprising a pair of telescoping members axially movable with respect to one another to expose an opening for receiving and gripping the thermometer. The gripping section is linked to a shaft which is rotatable upon the application by hand of an axial force to a gripping member coupled to the shaft to convert the axial motion of the gripping member to the rotation of the shaft and thus of the gripping section.

3 Claims, 7 Drawing Figures

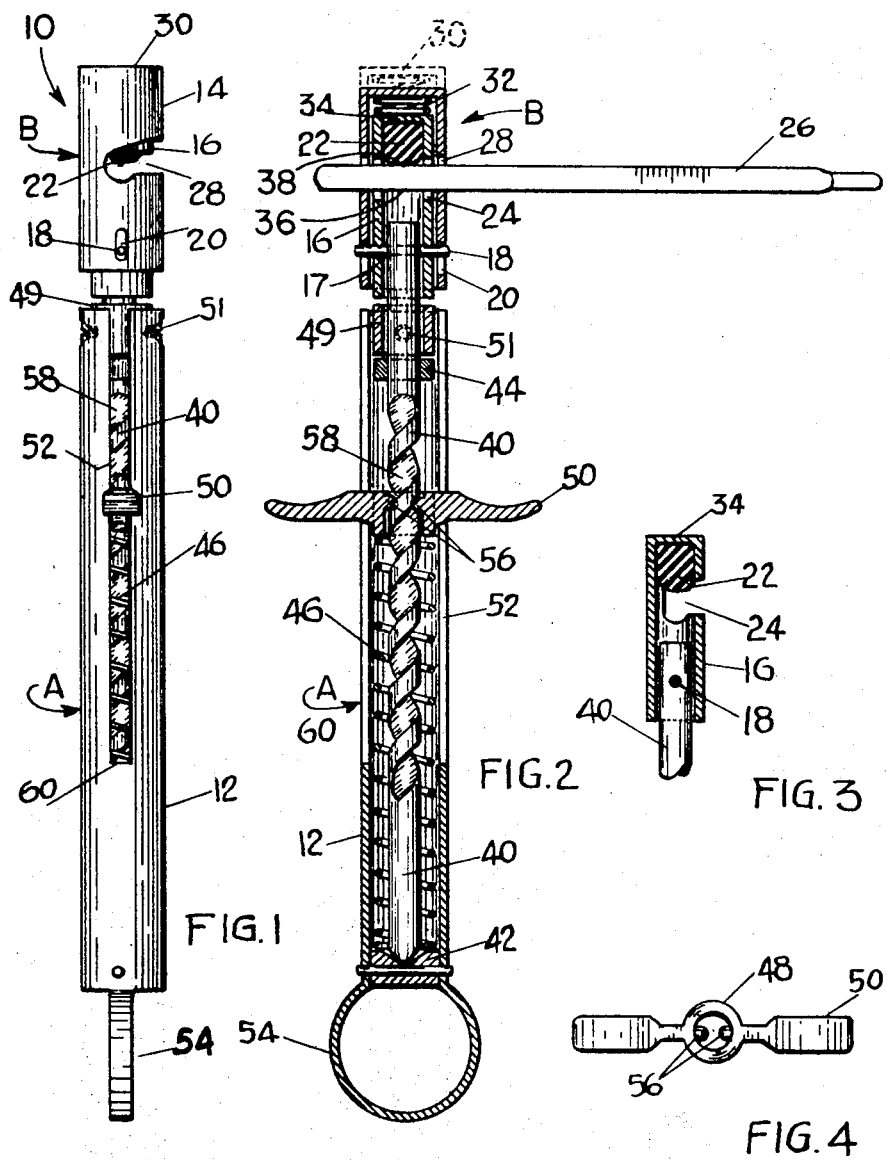

THERMOMETER SPINNER

The invention relates generally to medical instruments, and more particularly to an improved, hand-operated thermometer spinner.

It is common practice in hospitals for the nurse or attendant to shake a mercury thermometer after its use to thereby restore the mercury to its reference position for subsequent use.

In my U.S. Pat. No. 3,379,369, entitled Combined Medical Thermometer and Sterilizer Therefor, I have disclosed an improved thermometer spinner in which two tubes are joined at their ends. One tube is hollow and holds the thermometer, and the other tube is employed as the spinner. The difficulty with this spinner is that it requires the use of both hands in the spinning operation, and also requires the use of a closure cap to cover the thermometer holding tube.

It is an object of the invention to provide an improved hand-operated thermometer spinner, which can be operated with only one hand.

It is another object of the invention to provide a thermometer spinner in which greater ease of insertion and security of thermometer retention are achieved in a reliable and economical device.

In one aspect of the invention, the spinning section of the thermometer spinner includes a pair of concentrically arranged tubular members each having a radial opening formed therein. These members are normally biased so that their openings are non-aligned. For use, one of the members is moved axially with respect to the other to place the openings in at least partial registration to permit a thermometer to pass through the thus aligned openings. When the axial force is thereafter removed the thermometer passing through the openings is securely retained by the axial force exerted by a biasing member tending to move the openings away from alignment.

In another aspect of the invention, the spinning section is linked to the upper end of a shaft. A wing-like gripping member is coupled to the shaft and is adapted to be axially downwardly moved by the use of the fingers of a single hand. That axial movement of the gripping member is converted to rotational movement of the shaft, and thus to the thermometer spinning section, to thereby cause the mercury in the thermometer to return to its normal position as a result of the resulting centrifugal force.

Further objects and features of my invention will be had from the following specification taken in connection with the accompanying drawings in which:

FIG. 1 is an elevation view of a thermometer spinner according to one embodiment of the invention;

FIG. 2 is a vertical cross-section of the thermometer spinner of FIG. 1 shown securely holding a mercury thermometer;

FIG. 3 is a fragmentary elevational view, partly in section of the spinning section of the thermometer spinner;

FIG. 4 is a plan view of the sliding manually operable collar of the thermometer spinner;

Figure 5:
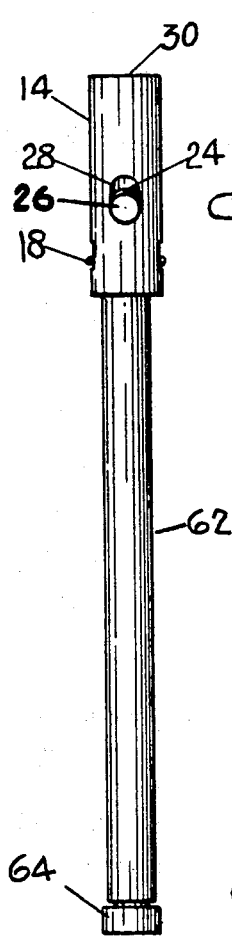
FIG. 5 is an elevational view of a thermometer spinner according to a second embodiment of the invention.

A medical thermometer according to one embodiment of the present invention as shown in FIGS. 1–4 is generally designated 10 and comprises a lower, stationary slotted tube 12, of a lower supporting section A. A thermometer holding and spinning section B includes an upper closure, perforated slidable jacket tube 14, and a perforated and closure topped inner arresting tube 16 coaxially disposed within tube 14. Tubes 14 and 16 are in axial alignment with tube 12 and are linked by means of a cross pin 18, tightly passed through the wall of inner tube 16. Cross pin 18 is loosely accommodated in an opposing longitudinal opening 20 formed adjacent the lower end of jacket tube 14. Inner tube 16 encloses a tightly pressed-in rubber insert plug 22 (FIG. 3) having a lower tip terminating slightly below the upper lip of an aperture 24 (FIG. 2) formed in tube 16, leaving a sufficient aperture space to permit a conventional medical mercury thermometer 26 to pass through section B when aperture 28 of tube 14 becomes aligned with aperture 24 as a result of the downward movement of tube 14 produced by a downward force applied to a top closure blank 30 of outer jacket tube 14 against the counter force produced by a short compression coil 32 (FIG. 2) located between top closure blanks 30 of outer tube 14 and the upper closure blank 34 of inner tube 16.

After passing medical thermometer 26 through the apertures 24 and 28 in the manner just decribed and then releasing the downward pressure from closure blank 30, compressed coil spring 32 seated on top closure blank 34 of inner tube 16, tends to move outer sliding jacket 14 back to its original position, to thereby move the lower lip of aperture 28 against the underside 36 of thermometer 26 and consequently to press its upper side 38 against rubber plug 22, thereby creating a strong frictional hold on thermometer 26 as long as the action of compression coil spring 32 prevails.

Spinning section B is linked for rotation to support section A by means of cross pin 18 which passes through the upper end of a double fluted shaft 40 and through openings 17 and 20 in tubes 16 and 14 respectively. Pin 18 serves to properly align and limit relative axial movement between sliding outer jacket tube 14 and inner tube 16 as well as serving as the linking element between the spinning section elements and the operational elements enclosed by lower slotted tubular casing 12.

Double fluted shaft 40 is rotatably set and centered at its lower end by a partly hollowed thrust bearing 42 and by a centering collar 44 respectively, near to the top end of casing 12. Shaft 40 is surrounded by a compression coil spring 46 which at its bottom end is seated on the hollowed face of thrust bearing 42, and the top end of spring 46 is thrust freely against the under side of a sliding collar ring 48. A retainer collar 49 surrounds the upper end of shaft 40 and is secured to the upper end of casing 12 by means of set screws 51. A pair of transverse wing-like grasping members 50 are attached to sliding collar ring 48 (FIG. 4) and extend radially through slots 52 formed in casing 12. The upper arcuate surface of members 50 serve as the rest for two operating fingers of one hand for the activation of the spinner to rotate spinning section B, while the thumb of the same hand is inserted through a thumb ring 54 attached to the lower end of casing 12. Thus, the spinner structure may be safely and properly held between the thumb and two other fingers of the same hand to cause the repeated rotation of section B, when a thermometer is held by the latter in a manner to be described hereinafter.

As indicated in FIGS. 2 and 4, two oppositely located knob-like protrusions or dogs 56 extend from the inner surface of sliding collar 48 into the depressions 58 of spiral fluted shaft. By axially moving collar 48, by means of a downward force exerted by the user's fingers resting on the upper arcuate surface of members 50, down along slots 52 against the action of coil spring 46, the protruding dogs 56 engage spiral flutes 58 of shaft 40 and cause shaft 40 to rotate. The upper end of shaft 40 is connected to upper outer and inner tubes 14 and 16 of section B by means of pin 18 as described above, the latter in turn securely grasping thermometer 26. As a result, the rotation of shaft 40 produces a corresponding rotation of spinning section B and of thermometer 26. The rotation, in turn, creates a centrifugal force to return the mercury in thermometer 26 to its reference position in a known manner.

The releasing of the downward pressure on wing members 50, and thus on coil spring 46, returns collar 48 to its normal position with the two operating fingers still engaging the finger rest members 50 and the thumb remaining within thumb ring 54. The spinner structure is again set and ready for a repeat spinning of the thermometer by removing the downward finger pressure, to thereby move collar 48 down until it is stopped by the lower terminal end 60 of slots 52.

When inner tube 16 and outer tube 14 of spinning section B are in their normal position, as shown in FIG. 1, aperture 28 of outer tube 14 is not in registration with aperture 20 of inner tube 16. In order to admit thermometer 26, apertures 20 and 28 are brought into alignment by depressing top 30 of outer tube 14 from the position indicated by the broken lines in FIG. 2 to the position shown in the solid lines in FIG. 2.

After the mercury in the thermometer has been returned to its normal position, the thermometer may be removed from the grip exerted on the thermometer by the combined action exerted by the squeezing rubber plug 22 and the diagonally opposing lower lips of aperture 28 of outer tube 14, by applying a slight pressure on top 30 against the opposing force of coil spring 32, thereby creating a momentary line-up between apertures 20 and 28 to permit the free passage for the removal of thermometer 26 from the spinning section.

Figure 6:
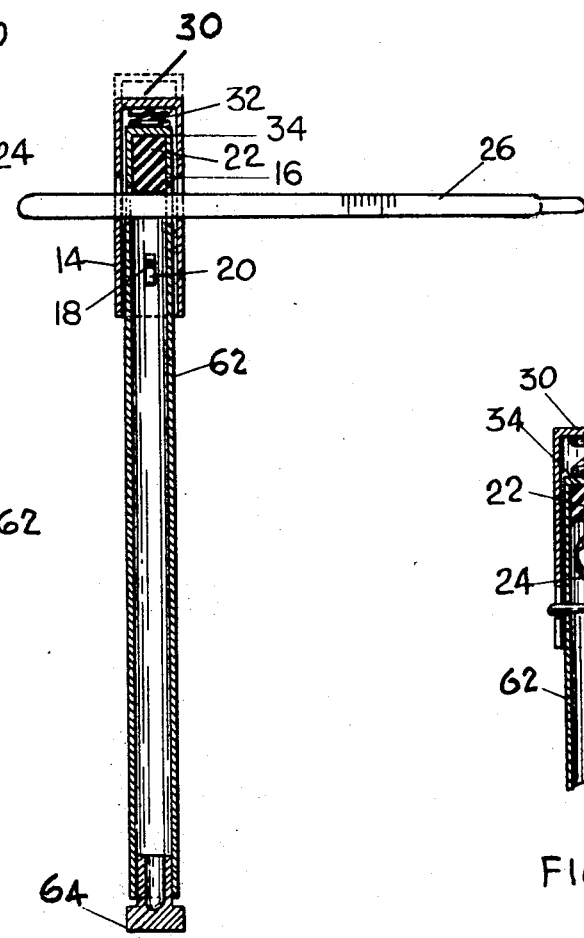
FIG. 6 is a vertical cross-section of the thermometer spinner of FIG. 5 shown grasping a mercury thermometer.
Figure 7:
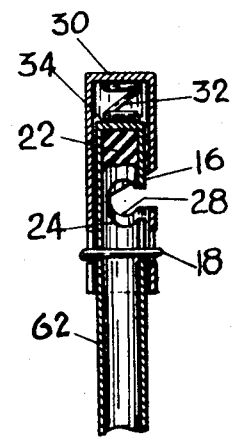
FIG. 7 is a vertical cross-section of the spinning section of the embodiment of FIG. 5.

FIGS. 5–7 illustrate a second embodiment of the invention which the spinning section is substantially the same as in the earlier described embodiment of FIG. 4 and will thus not be further described herein. The embodiment of FIGS. 5–7, however, differs in the construction of the lower stationary supporting section, which in the latter embodiment includes a hollow tube 62 secured at its lower end by a removable closure plug 64, and secured to the telescopically arranged coaxially aligned tubes of the upper spinning section by means of cross-pin 18 as seen best in FIG. 7.

In operation the thermometer to be shaken down is inserted into and grasped by the cooperating axially movable tubular members of the spinning section much in the manner as described above with respect to the embodiment of FIG. 4. The stationary tube 62 is then placed between the palms of both hands which are moved in opposite transverse directions, thereby rotating the tube and thus the thermometer in alternating directions. As a result, a centrifugal force is created on the mercury in the thermometer as desired.

Once the thermometer has been shaken down in this manner, the thermometer may thereafter be stored in the interior of tube 62 after the prior removal of plug 64. The thermometer is securely and sanitarily retained in the tube interior by the replacement of plug 64 therein.

While the invention has been herein described with respect to two embodiments thereof, it will be apparent that modifications may be made therein without departing from the spirit and scope of the invention.

I claim:

1. A thermometer spinner for shaking down a medical thermometer or the like, comprising first and second telescopically and coaxially arranged tubular members, each of said first and second tubular members having diametrically arranged apertures in respective registration with one another, a cross-pin passing through said apertures for limiting the relative rotational movement of said first and second tubular members, said cross-pin also comprising means for permitting limited relative axial movement of said first and second tubular members, each of said tubular members comprising mutually cooperating means for receiving and frictionally retaining a thermometer at a substantially right angle to the axis of said first and second tubular members, a third tubular member coupled to said first and second tubular members and comprising means effective when operated manually to rotate said first and second tubular members, means arranged intermediate said first and second tubular members for normally biasing said cooperating members in a position preventing the insertion of a thermometer therein and responsive upon the application of a manual force to one of said first and second tubular members to relatively position said first and second tubular members in a manner permitting the reception and grasping of a thermometer therein, and a spirally double fluted shaft contained in said third tubular member, and linked by means of said cross-pin to said first and second tubular members to produce simultaneous rotation of said first and second tubular members and the thermometer carried thereby upon the rotation of said shaft.

2. The thermometer spinner of claim 1, in which a pair of slots is axially formed in said third tubular member, and further comprising interengaging means axially movable in said slots and coupled to said shaft for rotating said shaft upon the axial movement of said interengaging means along said slots, and manual operating means coupled to said interengaging means and extending outwardly through said slots generally at right angles thereto.

3. A thermometer spinning device comprising first and second telescopically arranged tubular members adapted to safely retain a medical thermometer and coupled to one end of a third stationary tubular member, a shaft spirally threaded with double flute grooves in said stationary tubular member, rotation inducing and longitudinally movable interengaging means coupled to said shaft and provided with a pair of laterally extending wing-like attachments extending through a pair of slots formed in said third tubular member and adapted to sustain pressure induced by the fingers of one hand for causing longitudinal movement of said wing-like extensions along said slots, a compression spring in said third tubular member surrounding a portion of said shaft and engaged by said wing-like extensions, an appendage attached to the other end of said stationary tubular member for receiving the thumb of the hand when shifting said interengaging means with the above named fingers against or with the action of said spring, the fingers and thumb of the same hand cooperating together to ensure a safe hold and guided reciprocating shifting operation with said lateral wing-like extensions, which in turn cause rotation of said spirally fluted shaft and the connected thermometer gripping device for subjecting the thermometer to centrifugal force for the purpose of restoring the original low reading of the thermometer.

* * * * *